(12) United States Patent
Sathyanarayana et al.

(10) Patent No.: US 9,755,945 B2
(45) Date of Patent: Sep. 5, 2017

(54) STREAM PUBLISHING AND DISTRIBUTION CAPACITY TESTING

(71) Applicant: EdgeCast Networks, Inc., Playa Vista, CA (US)

(72) Inventors: Karthik Sathyanarayana, Los Angeles, CA (US); Jonathan DiVincenzo, Los Angeles, CA (US); Jie Feng, Los Angeles, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 191 days.

(21) Appl. No.: 14/675,884

(22) Filed: Apr. 1, 2015

(65) Prior Publication Data
US 2016/0292058 A1    Oct. 6, 2016

(51) Int. Cl.
*G06F 11/00* (2006.01)
*H04L 12/26* (2006.01)
*H04L 29/06* (2006.01)

(52) U.S. Cl.
CPC .......... *H04L 43/50* (2013.01); *H04L 65/4069* (2013.01)

(58) Field of Classification Search
CPC .......... G06F 11/2273; G01R 31/31707; G01R 31/318371
See application file for complete search history.

(56) References Cited

U.S. PATENT DOCUMENTS

| | | | | |
|---|---|---|---|---|
| 5,838,919 A | * | 11/1998 | Schwaller | H04L 43/50 709/224 |
| 5,881,237 A | * | 3/1999 | Schwaller | H04L 43/50 709/224 |
| 5,937,165 A | * | 8/1999 | Schwaller | H04L 12/2697 709/224 |
| 6,292,822 B1 | * | 9/2001 | Hardwick | G06F 8/451 718/102 |

(Continued)

OTHER PUBLICATIONS

Zhu, "MAC for Dedicated Short Range Communications in Intelligent Transport System", Dec. 2003, IEEE, p. 60-67.*

(Continued)

*Primary Examiner* — Bryce Bonzo
*Assistant Examiner* — Jeison C Arcos
(74) *Attorney, Agent, or Firm* — Los Angeles Patent Group; Arman Katiraei

(57) ABSTRACT

Some embodiments dynamically test capacity of a streaming server under test (SUT). The dynamic testing involves a test server generating different test scenarios. Each test scenario specifies a mix of different streaming protocols, content streams, and content stream upload to download ratio. The test server tests the SUT with a gradually increasing traffic load from each test scenario while monitoring SUT performance under each load. The test server records each load from each test scenario under which the SUT becomes saturated. The test server produces a grid mapping the observed SUT saturation points to the test loads that caused them. The grid is used when the SUT is deployed to a (Continued)

production environment to determine if SUT saturation is imminent based on current traffic patterns being serviced by the SUT in the production environment. If so, a remedial action is dynamically performed to prevent the saturation from occurring.

18 Claims, 11 Drawing Sheets

(56) References Cited

U.S. PATENT DOCUMENTS

| | | | | |
|---|---|---|---|---|
| 6,408,335 | B1* | 6/2002 | Schwaller | H04L 12/2697 703/13 |
| 6,438,652 | B1* | 8/2002 | Jordan | G06F 9/505 709/219 |
| 6,625,648 | B1* | 9/2003 | Schwaller | H04L 12/2697 370/230 |
| 7,158,907 | B1* | 1/2007 | Soldo | G06F 11/3684 702/108 |
| 8,276,123 | B1* | 9/2012 | Deng | G06F 11/368 714/37 |
| 9,240,949 | B2* | 1/2016 | McMurry | H04L 47/127 |
| 2002/0143999 | A1* | 10/2002 | Yamagami | G06F 3/0605 709/249 |
| 2003/0086536 | A1* | 5/2003 | Salzberg | H04M 3/22 379/15.02 |
| 2004/0078674 | A1* | 4/2004 | Raimi | G06F 17/504 714/33 |
| 2004/0220792 | A1* | 11/2004 | Gallanis | G06F 11/3447 703/13 |
| 2011/0069620 | A1* | 3/2011 | Gintis | H04L 12/2697 370/250 |
| 2013/0058412 | A1* | 3/2013 | Chen | H04N 19/436 375/240.13 |
| 2013/0262931 | A1* | 10/2013 | Siddalingesh | G06F 11/3672 714/28 |
| 2013/0326202 | A1* | 12/2013 | Rosenthal | G06F 11/3428 712/227 |
| 2015/0036504 | A1* | 2/2015 | McMurry | H04L 47/127 370/236 |

OTHER PUBLICATIONS

Cisco, "Configuring Real Servers and Server Farms", Nov. 2007, Cisco, OL-16201-01, p. 1-82.*
Kounev, "Performance Modeling and Evaluation of Distributed Component-Based Systems Using Queueing Petri Nets", Jul. 2006, IEEE, vol. 32 No. 7, p. 486-502.*
Pelletta, "Performance measurements of the saturation throughput in IEEE 802.11 access points", Apr. 2005, Royal Institute of Technology, p. 1-10.*
Cisco, "Cisco 4700 Series Application Control Engine Appliance Server Load-Balancing Configuration Guide", Aug. 2008, p. 1-546.*

* cited by examiner

| Processor Saturation | Load4:Scenario1 | Load6:Scenario2 | Load2:Scenario3 |
|---|---|---|---|
| Memory Saturation | Load3:Scenaro1 | Load5:Scenaro2 | Load7:Scenaro3 |
| Network Saturation | Load4:Scenario1 | Load6:Scenario2 | Load3:Scenario3 |
| Upload Failure | Load2:Scenario1 | Load8:Scenario2 | Load3:Scenario3 |
| ⋮ | ⋮ | ⋮ | ⋮ |
| Download Failure | Load3:Scenario1 | Load3:Scenario2 | Load4:Scenario3 |

STREAM PUBLISHING AND DISTRIBUTION CAPACITY TESTING

BACKGROUND INFORMATION

The consumption of streaming and media content is moving from traditional broadcast mediums, such as cable and satellite, to Internet based consumption. Special purposed machines, commonly referred to as streaming servers, are responsible for any or both of the intake and delivery of the streaming content. These servers have sufficient capacity to intake and deliver multiple content streams simultaneously.

Content publisher experience in publishing content to a streaming server and content consumer experience in streaming or downloading the uploaded content from the streaming server is dictated in large part by the streaming server's capacity. If the server becomes overutilized from too many simultaneous uploads and/or downloads, then content publishers attempting to upload content to the server may experience various failures or delays while publishing the content and content consumers requesting content may fail to receive their requested content or may receive the requested content with significant delays, buffering, or lowered quality. The degraded server performance is also unlikely to be isolated to a single content publisher or content consumer, but rather propagated to affect all such users that simultaneously attempt to use the server during a period of overutilization.

When the user experience becomes impaired, users including content publishers and content consumers will likely stop their use of the server or server platform altogether. This creates a snowball effect, whereby content publishers will not upload their content to the server, because the content cannot be delivered efficiently, and content consumers will not request or download content from the server, because content publishers have not uploaded content thereto. This problem is exacerbated when the publishing and delivery is performed by a distributed platform, such as a content delivery network (CDN).

A typical CDN has a distributed server footprint. The CDN establishes various points-of-presence (PoPs) at various geographic regions with each PoP having one or more servers that handle the publishing from and delivery to users (i.e., content publishers and content consumers) geographically proximate to the PoP. The distributed server footprint creates the potential for multiple different points of degraded performance or failure. For instance, a CDN can have PoPs in Los Angeles, New York, and Dallas with the New York PoP experiencing the greatest loads and becoming overutilized. As a result, content publishing and/or delivery performance to users geographically adjacent to the New York PoP can suffer, leading to a poor user experience, and users ultimately leaving the CDN platform even when the Los Angeles and Dallas PoPs provide acceptable performance.

With sufficient warning, the CDN can avoid the situation of a PoP or servers of a PoP becoming saturated. With sufficient warning, the CDN can shift the load from a potentially overloaded PoP to one of the other PoPs with excess capacity. Alternatively, the CDN can dynamically allocate additional resources to increase capacity at the overloaded server or PoP. The warning is the result of understanding the capacity of each streaming server in each PoP and the current load on each streaming server.

Load testing identifies capacity of a streaming server. Load testing involves a controlled test environment where the load on the streaming server is gradually increased until encountering a point of failure or performance degradation. Traditionally, these tests have been one dimensional in that they involve publishing different instances of the same content stream until the failure or performance degradation occurs or requesting different instances of the same content stream until the failure or performance degradation occurs.

In the real world however, the streaming server will intake different content streams from different content publishers while simultaneously delivering different content streams to different content consumers. Each content stream published to the streaming server and being downloaded from the streaming server imposes a different load on the streaming server. As some examples, the different content streams may be encoded and delivered at different bitrates, thereby requiring different processor and memory resources for publishing and delivery; the different content streams may be of different durations that lockup resources for longer or shorter periods of time; the different content streams may be uploaded and downloaded using a variety of different streaming protocols, each with different overhead and resource utilization; and the streaming server may experience different content stream upload to download ratios at different times with the uploaded and downloaded content streams consuming different amounts of resources.

Accordingly, static load testing methodologies and systems of the prior art do not adequately account for the dynamically changing loads that can be placed on a streaming server. The static load tests may identify one scenario where the streaming server may become overutilized, but fail to identify several other scenarios that may also occur as traffic conditions and streaming server usage changes. Consequently, the static load tests may fail to identify when the streaming server is on the verge of overutilization which would then cause actual performance degradation or failure.

There is therefore a need for dynamic load testing of a streaming server. Specifically, there is a need to automate different load scenarios in which the streaming server can become overutilized and intelligently increase and modify the loads to achieve a state of automated testing. There is further a need to leverage the dynamic load test results for real-time health check applications. In other words, there is a need to correlate the dynamic load test results with actual real-time loads experienced by the servers in order to identify instances where server saturation is imminent. There is further a need to incorporate the dynamic load testing as part of a dynamic resource allocation methodology and system such that when any server within a distributed platform nears overutilization, the methodology or system can dynamically allocate more resources for servicing the loads on that server or restrict further load, thereby avoiding overutilization in the real world.

BRIEF DESCRIPTION OF THE DRAWINGS

A preferred embodiment will now be described, by way of example only, with reference to the accompanying drawings in which:

FIG. 8 conceptually illustrates a SUT saturation grid generated by the test server in accordance with some embodiments.

DETAILED DESCRIPTION OF PREFERRED EMBODIMENTS

Some embodiments provide systems and methods for dynamically testing streaming server performance and capacity, wherein the streaming server is any sever capable of performing one or more of the following responsibilities including accepting and storing live or linear streams published via one or more streaming protocols, and delivering (live, linear or recorded) streaming content to client devices via one or more streaming protocols. The streaming server may also transcode (i.e., re-encode content using different codecs) or modify the content container through transmuxing before delivering to the client. The systems and methods are implemented with a special purposed test server machine of some embodiments that tests capacity of different streaming servers under test (SUTs). A content stream includes media content that is not static in nature and can contain video, audio, or interactive elements.

Figure 1:
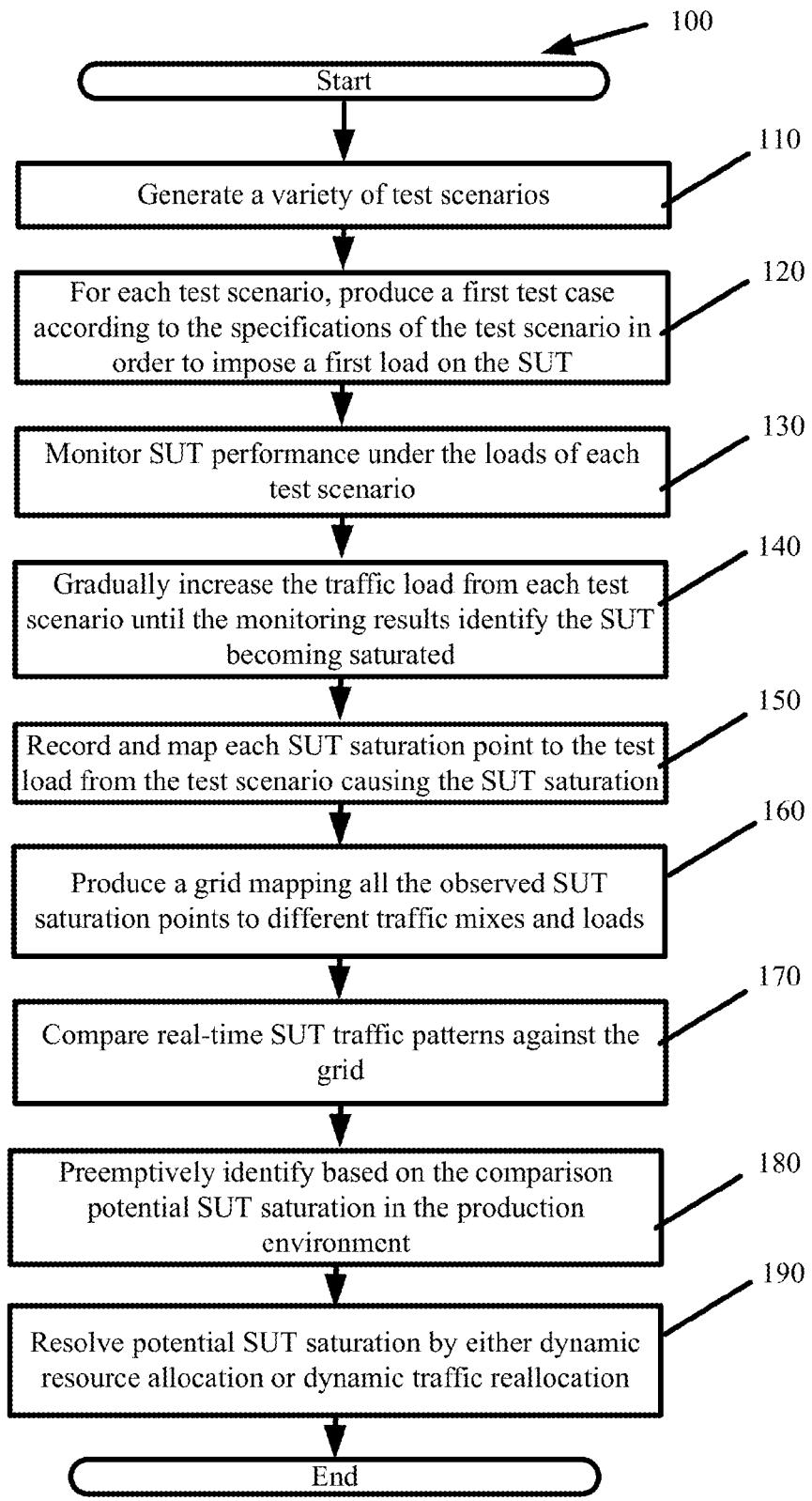
FIG. 1 presents a process for the dynamic testing performed by the test server of some embodiments.

FIG. 1 presents a process 100 for the dynamic testing performed by the test server of some embodiments. The dynamic testing process involves generating (at 110) a variety of test scenarios with the test server. Each test scenario specifies a mix of different streaming protocols, content streams (e.g., file sizes, bitrates, encoding, etc.), and content stream upload to download ratio. In other words, each test scenario generates a different mix of emulated content publishers uploading different content streams using different protocols to the SUT and emulated content consumers requesting and downloading different content streams to the SUT.

Figure 2:
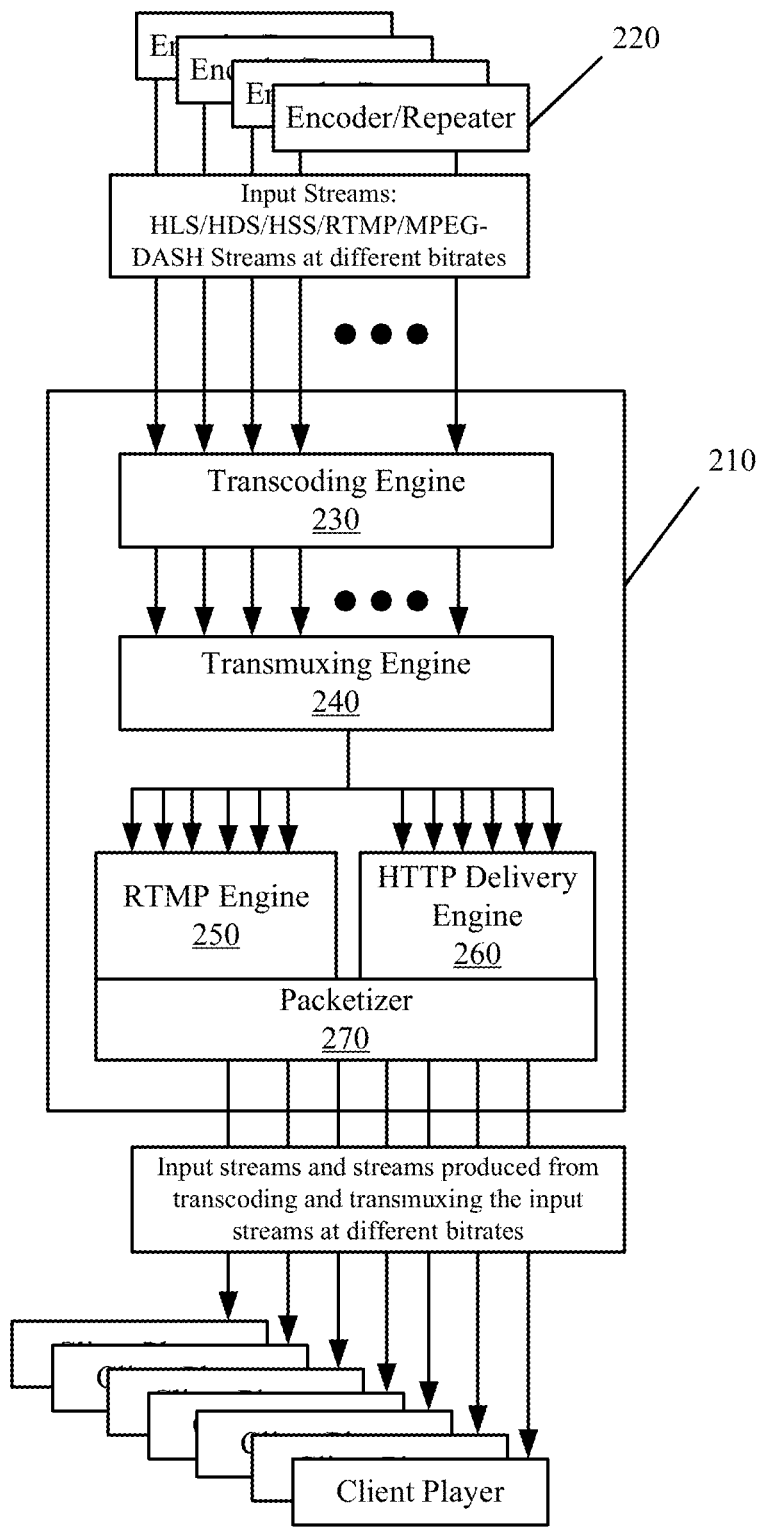
FIG. 2 illustrates inputs, outputs, and features of a SUT with the test scenarios testing different subsets of these inputs and outputs, and as a result, testing different SUT feature sets.

FIG. 2 illustrates inputs, outputs, and features of a SUT 210 with the test scenarios generated at step 110 testing different subsets of these inputs and outputs, and as a result, testing different SUT 210 feature sets. The SUT 210 inputs include live or linear streams received from encoders or repeaters 220 used by various content publishers in order to publish streams to the SUT 210. The published streams can be passed using any one of several streaming protocols including the Real Time Messaging Protocol (RTMP), HyperText Transfer Protocol (HTTP), Real Time Streaming Protocol (RTSP), and Microsoft Media Services (MMS). Some HTTP based streaming protocols include HTTP Dynamic Stream (HDS), HTTP Live Streaming (HLS), HTTP Smooth Streaming (HSS), and MPEG Dynamic Adaptive Streaming over HTTP (DASH). The SUT 210 contains a transcoding engine 230 and transmuxing engine 240. These engines 230 and 240 can take a particular stream of a given bitrate and produce different bitrate encodings of the same stream to support streaming to client devices with differing resources or capabilities. These engines 230 and 240 can also take a particular stream encoded with a specific set of codecs and/or published with a particular streaming protocol and reproduce the particular stream so that it can be delivered to client devices supporting other codecs over other supported streaming protocols. The RTMP engine 250 responds to client requests for RTMP streams by obtaining the various RTMP streams produced by the transcoding engine 230 and the transmuxing engine 240 and by passing the stream that is optimal for the requesting user in terms of codecs and bitrates as some examples. Similarly, the HTTP delivery engine 260 responds to client requests for an HLS, HDS, HSS, or MPEG-DASH stream by obtaining those streams produced by the transcoding engine 230 and the transmuxing engine 240 and by passing the stream that is optimal for the requesting client in terms of codecs and bitrates as some examples. The packetizer 270 supplements the output operation of the SUT 210 by breaking a stream into segments or chunks that are passed to client devices. Accordingly, the SUT 210 outputs can include dissemination of different streams using different streaming protocols at different bitrates.

The test scenarios generated at step 110 test SUT capacity and performance by simultaneously publishing different subsets of the inputs to the SUT and requesting different subsets of the outputs from the SUT. The test scenarios also test the SUT's features as part of testing SUT capacity and performance. For example, a test scenario can test the SUT's transcoding and transmuxing features by publishing an RTMP stream to the SUT at a first bitrate and by requesting the same stream using HLS and HDS at different second and third bitrates.

For each test scenario, the dynamic testing produces (at 120) a first test case according to the specifications of the test scenario in order to impose a first load on the SUT. In some embodiments, each test scenario and its corresponding test cases are embodied as a script that is executable by the test server, wherein execution of the test script involves the test server generating the actual streams to publish to the SUT as well generating the stream download requests according to the streaming protocols that are to be used in testing SUT capacity.

The dynamic testing further involves monitoring (at 130) the SUT performance under the loads of each test scenario, including tracking any errors that occur during SUT testing. In some embodiments, the test server also runs a co-process directly on the SUT. The co-process monitors specific SUT resources that the test server may not otherwise be able to monitor remotely from the SUT. These resources include any one or more of the SUT's processor, memory, and network usage in some embodiments.

Each test scenario is dynamic. The dynamic testing involves gradually increasing (at 140) the traffic load from each test scenario until the monitoring results identify the SUT becoming saturated. Here, the test server increases the number of simultaneous content streams being uploaded to and downloaded from the SUT in the proportion of the test scenario, using the same set of streaming protocols specified by the test scenario, to achieve SUT saturation.

Saturation is observed when the SUT experiences an unacceptable amount of failure in the upload or download delivery of one or more content streams of a given test scenario. Saturation is also observed when the SUT performance degrades resulting in latency or jitter values higher than some acceptable threshold. Saturation is the result of resource overutilization, wherein overutilized resources can be any one or more of processor, memory, or network resources of the SUT as some examples.

The different test scenarios used to test the SUT are intended to reveal different SUT saturation points. For instance, the test server identifies a first set of test scenarios and their associated traffic loads that cause overutilization of the SUT's processor, a second set of test scenarios and their associated traffic loads that cause overutilization of the SUT's memory, and a third set of test scenarios and their associated traffic loads that cause overutilization of the SUT's networking resources. As more specific examples, a first test scenario can involve the simultaneous upload of a large number of content streams leading to processor and memory overutilization and a second test scenario can involve the simultaneous requesting and downloading of a large number of content streams leading to network resource overutilization. Different SUTs have different saturation points because of their different hardware and software configurations. The different test scenarios map out and reveal these different SUT saturation points.

The dynamic testing process continues by recording and mapping (at 150) each SUT saturation point to the test load from the test scenario causing the SUT saturation. In other words, step 150 involves mapping and recording the SUT saturation point (e.g., failure, performance degradation, overloaded resource, etc.) along with the specific test traffic mix from each test scenario that resulted in the SUT saturation.

The dynamic testing produces (at 160) a grid mapping all the observed SUT saturation points to different traffic mixes and loads. The grid is then carried over with the SUT when the SUT is deployed in a production environment where the SUT is exposed and run against real-world traffic loads.

Once deployed in the production environment, the dynamic testing further involves comparing (at 170) real-time SUT traffic patterns against the grid in order to preemptively identify (at 180) potential SUT saturation in the production environment. More specifically, based on the real-time traffic mix hitting the SUT in the production environment, the grid pinpoints the specific one or more SUT resources in danger of saturation.

This then notifies the test server, SUT, or SUT administrator of the potential for saturation, allowing the issue to be resolved before any performance issues manifest. In some embodiments, any potential issues are automatically resolved by the dynamic testing process. In some such embodiments, the dynamic testing process uses the SUT saturation points identified from the grid as triggering points for initiating (at 190) dynamic resource allocation. The dynamic resource allocation can involve increasing or decreasing specific SUT resources (e.g., processor, memory, network, etc.) in danger of saturation, wherein the specific SUT resources in danger of saturation can be identified from the grid. In some embodiments, the SUT saturation points identified using the grid are triggering points for initiating (at 190) dynamic traffic reallocation involving rerouting of content stream upload and download requests to or away from the SUT when in the production environment.

Figure 3:
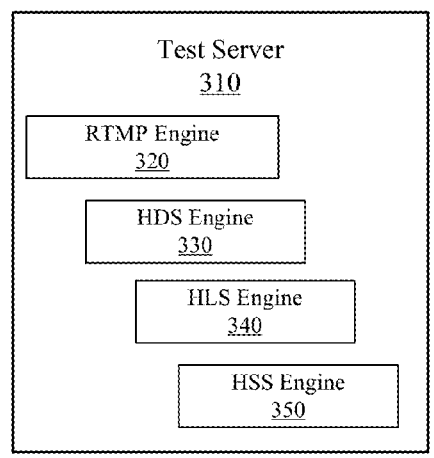
FIG. 3 conceptually illustrates the various emulation engines of the test server in accordance with some embodiments.

In order to emulate different content publishing clients and different content consumer clients, the test server is configured with different emulation engines. FIG. 3 conceptually illustrates the various emulation engines of the test server 310 in accordance with some embodiments. Each emulation engine 320, 330, 340, and 350 emulates client-side upload and/or download of a content stream according to a different supported streaming protocol. In some embodiments, the test server emulation engines 320, 330, 340, and 350 support one or more streaming protocols based on RTMP, HTTP (including HDS, HLS, and HSS), RTSP, and MMS.

An emulation engine for a particular streaming protocol can spawn several instances. Each emulating engine instance emulates a different client uploading or downloading a content stream according to the particular streaming protocol. In other words, a single emulation engine can spawn multiple instances to simulate different clients uploading to or downloading from the SUT different content streams, using the particular streaming protocol of the emulation engine. Each emulation engine instance emulates a different client by using a different address or address and port combination. Each instance of a particular emulation engine can be configured to emulate client-side operation of a content publisher publishing a content stream to a SUT or emulate client-side operation of a content consumer downloading a content stream from the SUT as well as be configured to specify which content stream will be uploaded or downloaded using the streaming protocol supported by that particular emulation engine.

In some embodiments, emulating client-side uploading of a content stream from an emulation engine instance involves submitting an initial request to upload a particular content stream to the SUT. The request may identify the content stream for upload, the streaming protocol to be used, and various parameters associated with the content stream. The SUT may respond to the request with authorization credentials that allow the test server to begin submitting packets encoding the content stream to the SUT. The emulation engine then begins to upload packets delivering the content stream to the SUT and responding to any streaming protocol control messaging sent by the SUT during the content stream upload. The control messaging can include acknowledgements from the SUT indicating certain packets were received, retransmit requests from the SUT requesting that certain packets be resent, and rate messaging from the SUT for adjusting the rate at which the emulation engine instance sends the packets. For example, in case of HLS live stream publish emulation, the HLS emulation engine periodically uploads manifest and segments to the SUT. The duration between consecutive manifest or segment upload depends on the segment duration, stream bitrate, segment length and latency between the test server and SUT.

In some embodiments, emulating client-side downloading of a content stream from an emulation engine instance involves submitting an initial request to download a particular content stream to the SUT. In response to the request, the SUT may provide a manifest file formatted according to a streaming protocol that is in use. The manifest file identifies chunks of the content stream that the emulation engine instance can request and download as well as various control messaging associated with the download. The emulation engine instance then requests desired chunks from the SUT in accordance with the manifest file. The SUT then responds to the requests by submitting the requested chunks. The emulation engine instance acknowledges the sent packets, ensures that they are received in order, requests retransmission of any lost packets, requests subsequent chunks of the particular content stream, and provides any other streaming control messaging necessary to ensure the delivery of the entire particular content stream. To conserve resources and maximize the number of emulation engine instances the test server can support at any given time, the emulation engine instances of some embodiments skip the processing intensive step of rendering the received packets. Each content stream downloading emulation engine instance can also vary the rate at which it requests subsequent chunks in order to simulate different network conditions including but not limited to packet loss scenarios and jitter.

Figure 4:
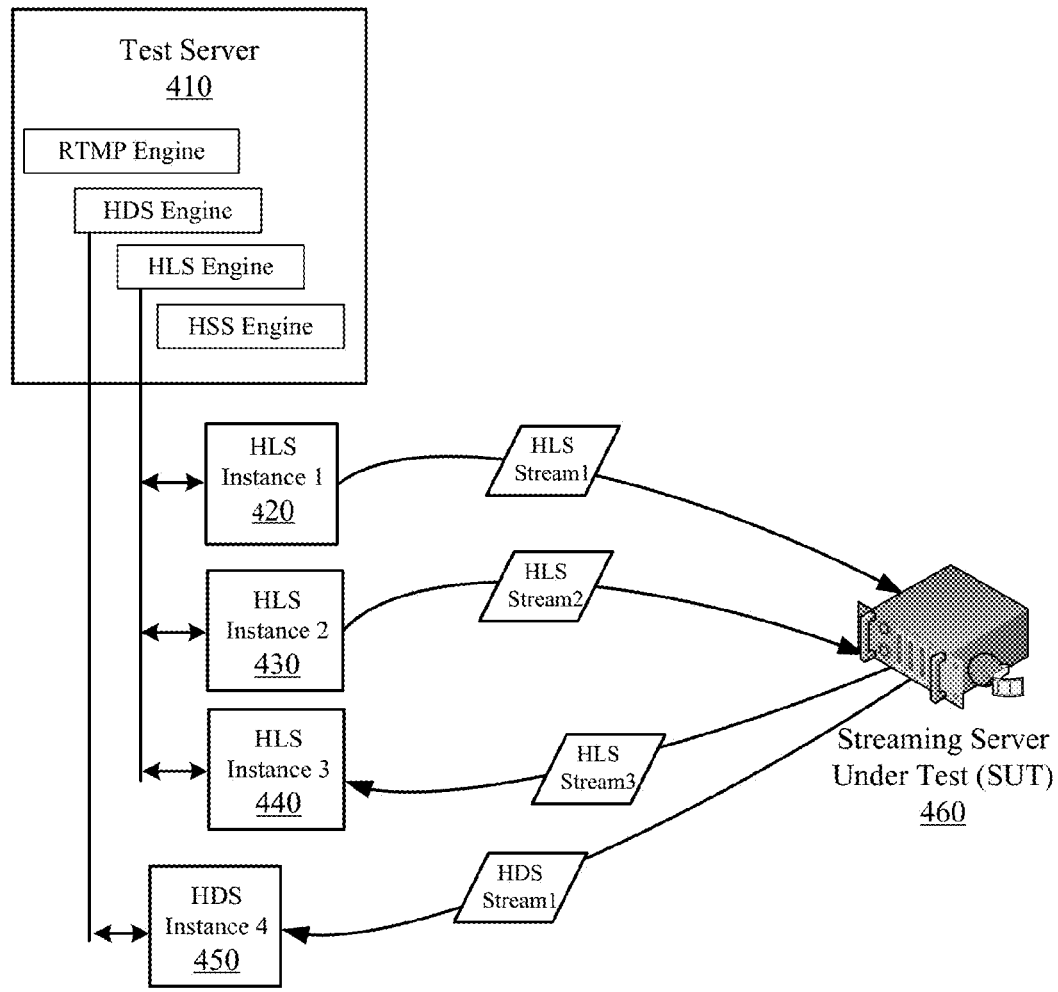
FIG. 4 conceptually illustrates a test server instantiating different emulation engine instances to test upload and download capacity of a SUT in accordance with some embodiments.

FIG. 4 conceptually illustrates a test server 410 instantiating different emulation engine instances 420, 430, 440, and 450 to test upload and download capacity of a SUT 460 in accordance with some embodiments. The test server 410 is configured with emulation engines that each support one of the RTMP, HLS, HDS, and HSS streaming protocols. The test server 410 instantiates first 420, second 430, and third 440 HLS emulation engine instances and a first HDS emulation engine instance 450 with which to test capacity of the SUT 460. As shown, the first HLS emulation engine instance 420 uploads a first content stream to the SUT 460 using HLS. The second HLS emulation engine 430 instance simultaneously uploads a second content stream to the SUT 460 using HLS. The third HLS emulation engine instance 440 simultaneously downloads a third content stream from the SUT 460 using HLS. The first HDS emulation engine instance 450 simultaneously downloads a fourth content stream from the SUT 460 using HDS.

FIG. 4 is illustrative of one test scenario with which the test server can test capacity of a SUT. Specifically, the test scenario involves using a specific mix of streaming protocols when simultaneously uploading to and downloading from the SUT some mix of content streams, wherein the mix of content streams can include streams of different bitrates, lengths, resolution, etc. In determining the SUT saturation point under the particular test scenario, the test server gradually increases the number of content streams being simultaneously uploaded to and downloaded from SUT, while preserving the test scenario mix of streaming protocols and content streams as well as the ratio of uploaded content streams to downloaded content streams. For instance, in gradually ramping up the FIG. 4 test scenario, the test server goes from a test scenario first test case involving simultaneously uploading two content streams using HLS, downloading one content stream using HLS, and downloading one content stream using HDS to a second test case involving simultaneously uploading four content streams using HLS, downloading two content streams using HLS, and downloading two content streams using HDS. Here, the mix of streaming protocols, content streams, and upload to download ratio of the test scenario is preserved as the load is gradually increased.

In some embodiments, the test server automatically generates the test scenarios from which different SUT saturation points are identified. Generating the test scenarios begins with configuring the test server with at least one content stream that can be uploaded to the SUT or downloaded from the SUT. Content streams used in testing the upload capacity of the SUT should be available locally or remotely to the test server so that it may upload one or more instances of the content stream to the test server. Content streams used in testing the download capacity of the SUT should be stored or made available to the SUT in advance or uploaded by the test server prior to requesting download of those content streams. The content streams can include a mix of live and on-demand streams, streams of differing lengths and complexity (e.g., resolution, color depth, frame rate, etc.), streams encoded at different bitrates, and streams that are encoded with different encoders or codecs. Alternatively, the test server can be provided a single stream from which the test server generates variations of the stream.

Generating the test scenarios optionally involves configuring the test server with the operational capabilities or supported functionality of the SUT. This includes identifying the SUT's intended use including, for example, which streaming protocols the SUT supports, whether the SUT supports content publishing and delivery or just one, what kind of content streams the SUT supports (e.g., short video clips, full length feature films, high definition content, supported bitrates, etc.), and any content streams available for download from the SUT.

Based on the test server configurations, the test server generates the test scenarios to comprehensively map SUT performance under a variety of traffic patterns. In some embodiments, the generated test scenarios do not specify an actual test case, but rather a testing framework specifying a mix of content streams, streaming protocols, and upload to download ratio with which to test the SUT, wherein the different content streams can include, for example, content streams of different lengths, bitrates, and resolutions.

Figure 5:
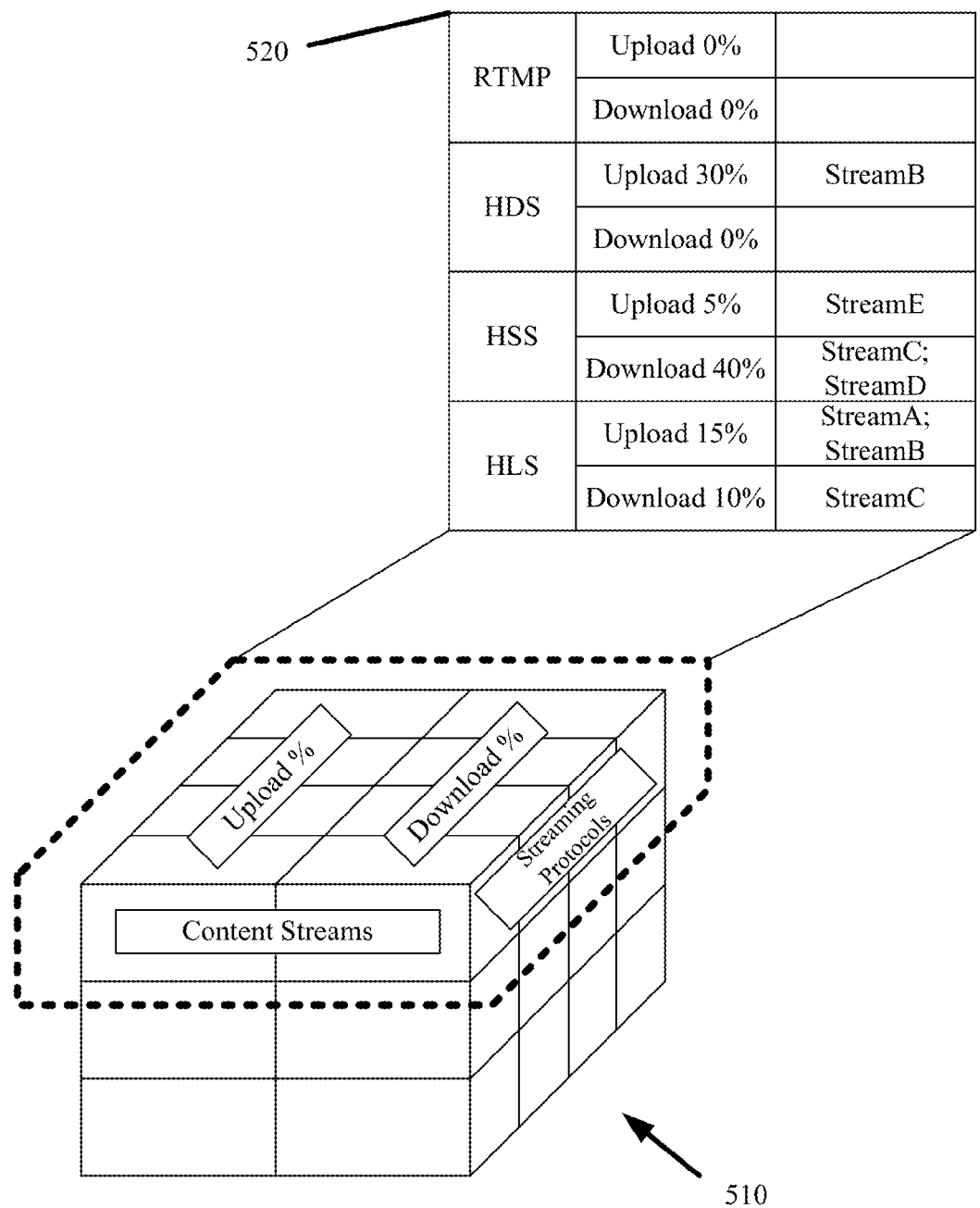
FIG. 5 conceptually illustrates different test scenarios with which a test server tests a SUT in accordance with some embodiments.

FIG. 5 conceptually illustrates different test scenarios with which a test server tests a SUT in accordance with some embodiments. FIG. 5 presents the different test scenarios as a matrix 510. For each test scenario, the matrix identifies the streaming protocols involved, the content streams involved, and the ratio of uploaded to downloaded content streams. In this figure, each matrix layer represents a test scenario. For instance, the top matrix layer represents test scenario 520.

From each test scenario, the test server produces different test cases that gradually increase the load on the SUT in accordance with the test scenario definition. For example, a test scenario may involve the test server simultaneously uploading the same number of streams to the SUT as the test server downloads from the SUT. In this example, the test server increases the load on the SUT by increasing the equal number of streams the test server simultaneously uploads to and downloads from the SUT. In some embodiments, the test case generation under each test scenario is dynamically performed until the SUT is saturated. SUT saturation occurs when performance of the SUT across different test cases of a test scenario begins to degrade or when errors outside acceptable error rates begin to occur.

In some embodiments, when a test load from a test scenario achieves SUT saturation, the test server may decrease the load by some amount less than the increase from the previous load. The test server then fine tunes the test load to isolate the specific load at which the SUT becomes saturated.

Figure 6:
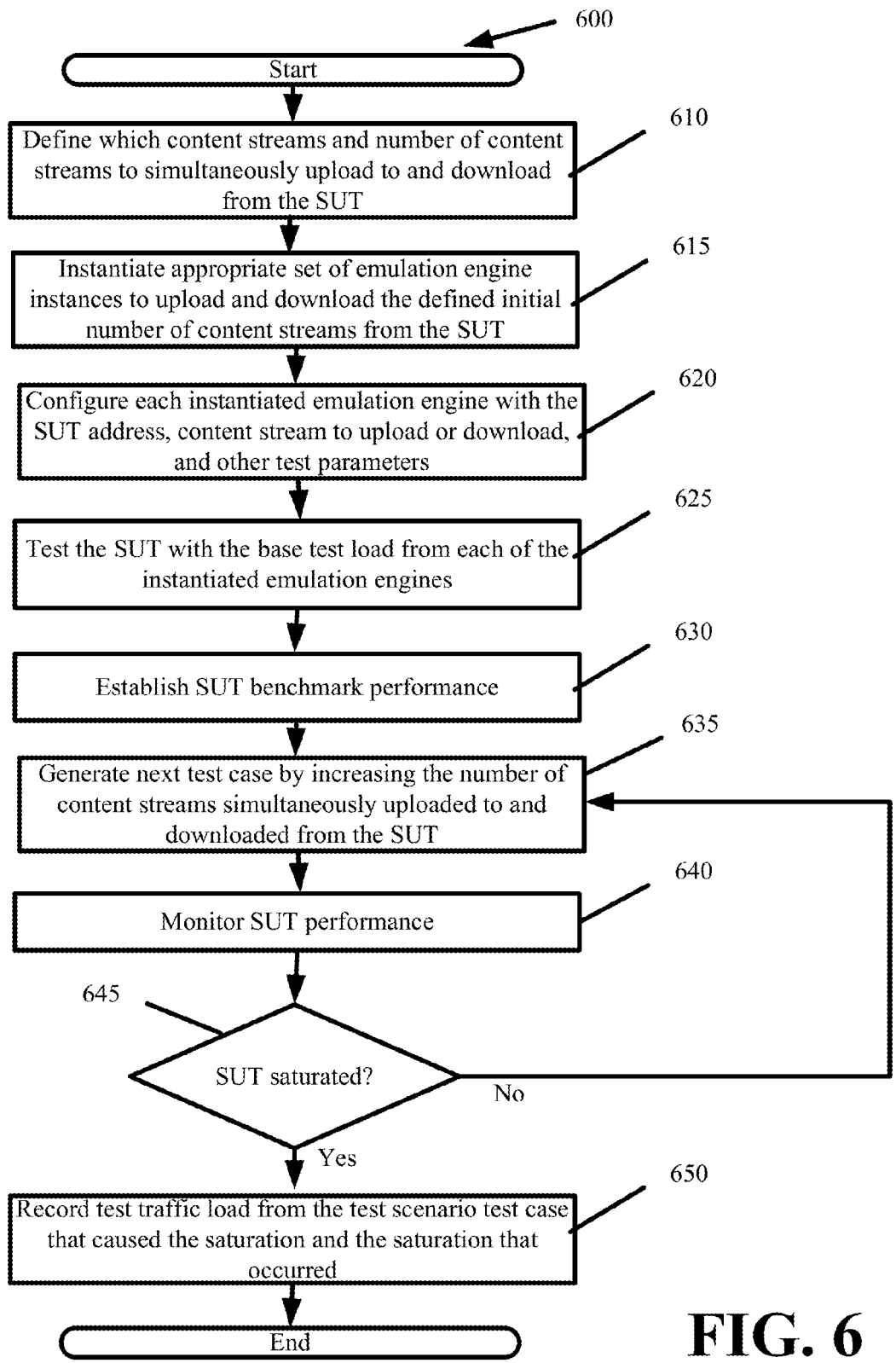
FIG. 6 presents a process for testing a SUT with a test scenario in accordance with some embodiments.

FIG. 6 presents a process 600 for testing a SUT with a test scenario in accordance with some embodiments. Process 600 is performed by the test server of some embodiments and is repeated for each test scenario generated for SUT testing.

The process 600 commences by generating an initial test case for the test scenario. Generating the initial test case involves setting a base test load by defining (at 610) which content streams and an initial number of content streams to simultaneously upload to and/or download from the SUT. The test server then instantiates (at 615) the appropriate set of emulation engine instances to upload and download the defined initial number of content streams from the SUT. The test server determines which emulation engine types (e.g., HLS, HDS, HSS, etc.) to instantiate based on the test scenario's streaming protocol specification. The test server configures (at 620) each instantiated emulation engine with an address to the SUT, a content stream to upload to or download from the SUT, and other test parameters that control client-side behaviors such as an upload or download rate, the introduction of errors in the upload or download, test start times, test end times, and test repeat intervals as some examples.

The process continues with the instantiated emulation engines testing (at 625) the SUT with the base test load. The process monitors the SUT performance. From the base test load, a baseline benchmark is established (at 630) for the SUT.

The process then generates (at 635) a next test case which gradually increases the test load on the SUT by increasing the number of content streams simultaneously uploaded to and downloaded from the SUT. This involves spawning additional emulation engine instances in addition to those that were previously spawned and configuring the new instances in accordance with the test scenario specification.

The process again monitors (at 640) the SUT performance. The process then determines (at 645) if the SUT has become saturated under the current test load. Saturation can be identified by comparing the current SUT performance to the baseline benchmark or other thresholds, or when the performance from the current test case monitoring results do not satisfy the performance thresholds configured for the test scenario. This can include detecting saturation when the upload or download of one or more content streams fails, when errors or other anomalies occur in the upload or download of one or more content streams, or when the upload or download of one or more content streams takes longer than a specified amount of time.

Figure 7:
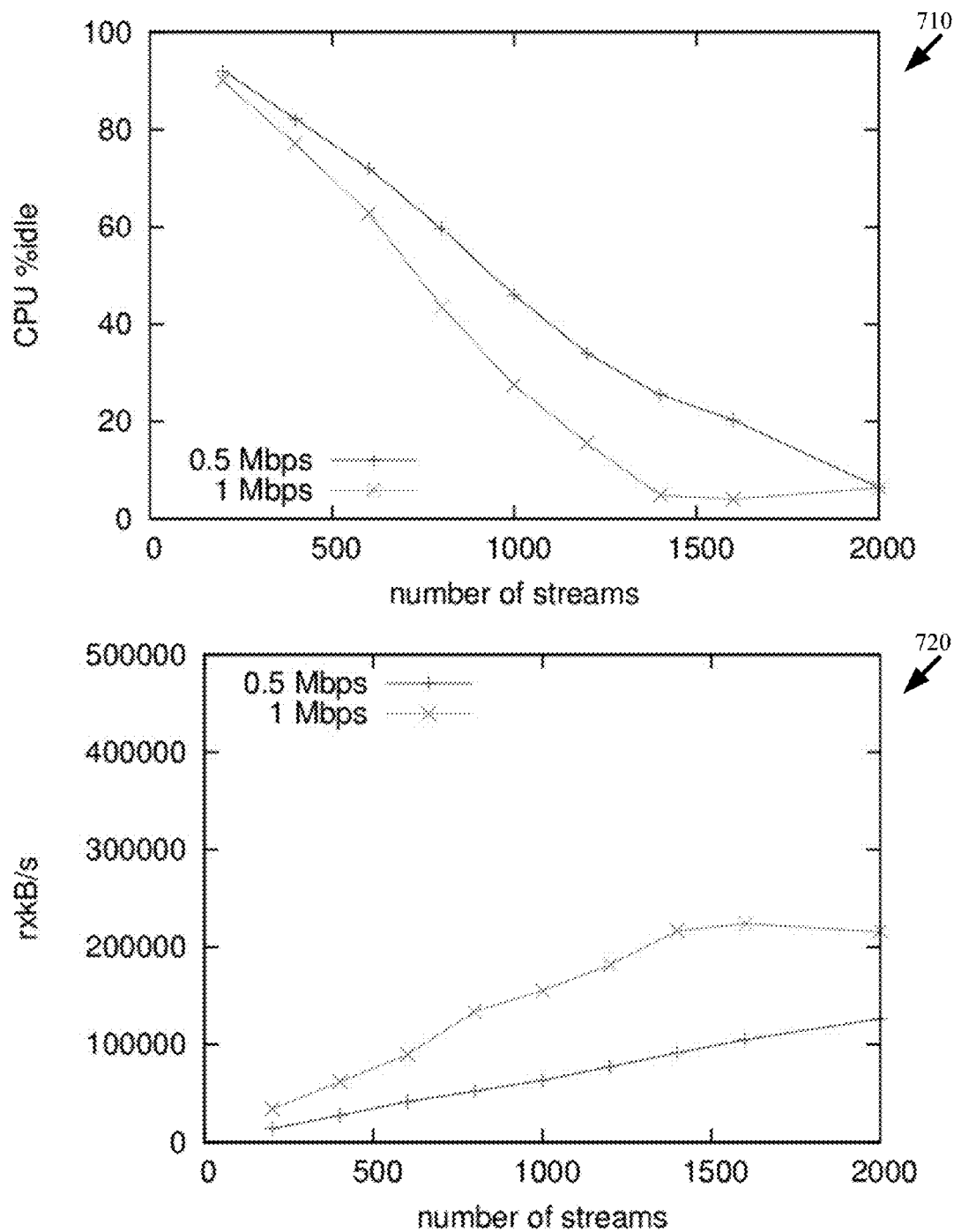
FIG. 7 illustrates monitoring results from one test scenario in which the number of simultaneous streams requested from the SUT increases until the SUT is saturated.

FIG. 7 illustrates monitoring results from one test scenario in which the test load defined by a number of simultaneous streams requested from the SUT increases until the SUT is saturated. The figure provides a first graph 710 illustrating the percentage of idle SUT processor cycles along the y-axis and the number of simultaneous content streams being downloaded from the SUT along the x-axis. The figure also provides a second graph 720 illustrating the bits per second served by the SUT along the y-axis and the number of simultaneous content streams being downloaded from the SUT along the x-axis. As shown, when the percentage of idle SUT processor cycles drops approximately below ten percent, the SUT is unable to serve all requested streams at the expected bit rate which is indicative of the SUT becoming saturated, and more specifically, the SUT processor becoming saturated.

When SUT saturation is identified, the process records (at 650) the test traffic load from the test scenario test case that caused the saturation and the saturation that occurred. In recording the saturation that occurred, the process can identify specific SUT performance that is impacted by the saturation, a specific failure resulting from the saturation, or specific SUT resources that became saturated. In some embodiments, the process makes fine tuned adjustments to the test load in order to isolate the specific load at which SUT saturation occurs. The fine tuned adjustments can include making small incremental decreases to the test load until the SUT is no longer saturated and then making smaller incremental increases to the test load until the SUT becomes saturated again. If SUT saturation is not identified at step 645, the process reverts to step 635 to generate another test case that again increases the load on the SUT under the specific test scenario and the process continues to test the SUT with the increased loads until a test case is reached that saturates the SUT.

In some embodiments, the test server performs client-side and server-side monitoring of SUT performance. Client-side performance monitoring is performed on a per stream basis by the emulation engine instance that uploads or downloads the stream. As the emulation engine instance uploads a content stream to the SUT or downloads a content stream from the SUT, the emulation engine generates a log that tracks various performance metrics associated with the content stream upload or download to the log. Each log entry may be associated with a timestamp identifying the time for when the measurement was taken.

In uploading a content stream, an emulation engine instance tracks the number of upload failures, upload latency, jitter experienced with different stream bitrates, and if the SUT was able to successfully respond to errors introduced by the emulation engine as some examples. In downloading a content stream, an emulation engine instance tracks whether the content stream was successfully downloaded, the rate at which the stream is downloaded, download latency, bytes downloaded, if any errors occurred during the download, if any packets arrived out of order, if the SUT was able to successfully respond to errors introduced by the emulation engine, if the manifest file was properly formatted, and if the stream packets were properly formatted and contained proper metadata as some examples.

The client-side performance monitoring exposes a first set of SUT saturation points, while the server-side performance monitoring exposes a second set of SUT saturation points. Some examples for the first set of SUT saturation points exposed from the client-side performance monitoring include test loads at which the SUT is unable to successfully accept content streams uploaded from one or more emulated clients, test loads at which the SUT experiences failure in delivering content streams in response to emulated client requests, test loads at which the SUT upload or download performance falls below a threshold rate, test loads at which the SUT drops or refuses emulated client connections, test loads at which the SUT experiences unacceptable amounts of packet loss, and test loads at which the SUT latency exceeds a performance threshold.

In some embodiments, the server-side performance monitoring is performed using a co-process running on the SUT. The co-process can be preinstalled on the SUT or can be configured on the SUT at test time by the test server. In some other embodiments, the server-side performance monitoring is performed by the test server using remote procedure calls to the SUT while testing the SUT, thereby obviating the need for the co-process to run on the SUT. For instance, the test server can pass command messaging to the SUT to cause the SUT to commence server-side monitoring.

The server-side performance monitoring involves tracking SUT resource usage while the SUT is under test. This includes monitoring SUT processor, memory, and network usage in real-time as the SUT responds to the different loads imposed by the different test scenario test cases. Other SUT performance metrics monitored as part of server-side performance monitoring can include the SUT cache hit ratio and disk utilization as some examples. In some embodiments, the test process generates a log on the SUT to record the results from the server-side performance monitoring. Each log entry can be associated with a timestamp to indicate the time the performance measurement was taken. The test server may extract the test process generated log from the SUT using a remote connection.

As noted above, the server-side performance monitoring exposes a different second set of SUT saturation points. Some examples for the second set of SUT saturation points exposed from the server-side performance monitoring include test loads at which the SUT processor utilization exceeds a processor utilization threshold, test loads at which the SUT memory utilization exceeds a memory utilization threshold, test loads at which the SUT network utilization exceeds a network utilization threshold, and test loads at which the SUT cache hit ratio falls below a desired amount.

From the monitoring results in the various client-side monitoring logs and server-side monitoring log, the test server generates a SUT saturation grid. FIG. 8 conceptually illustrates a SUT saturation grid generated by the test server in accordance with some embodiments. As shown, the SUT saturation grid includes a column 810 identifying different SUT saturation points and subsequent columns for each row identify the various test loads from the different test scenarios leading to each of the SUT saturation points. In other words, the SUT saturation grid provides a map that preemptively identifies loads at which SUT performance degrades or otherwise fails with each load specifying some specific mix of streaming protocols used in publishing and downloading a specific set of content streams according to an upload to download ratio of a test scenario. This saturation grid is generated specifically for the SUT having a specific software and hardware configuration. In other words, different SUTs with different software and hardware configurations will have different saturation grids.

The SUT saturation grid is used to ensure uptime and reliable performance of the SUT when the SUT is deployed into a production environment. In the production environment, the SUT responds to real-world customer upload and download requests. Any failures or performance degradation in the SUT's operation can result in a poor customer and user experience, thereby leading to lost customers and lost revenue. The saturation grid is created to provide the test server, SUT, or SUT administrator notice for when saturation is imminent, thereby allowing the test server, SUT, or SUT administrator to take preemptive steps to address the issues before they manifest and affect SUT performance.

Figure 9:
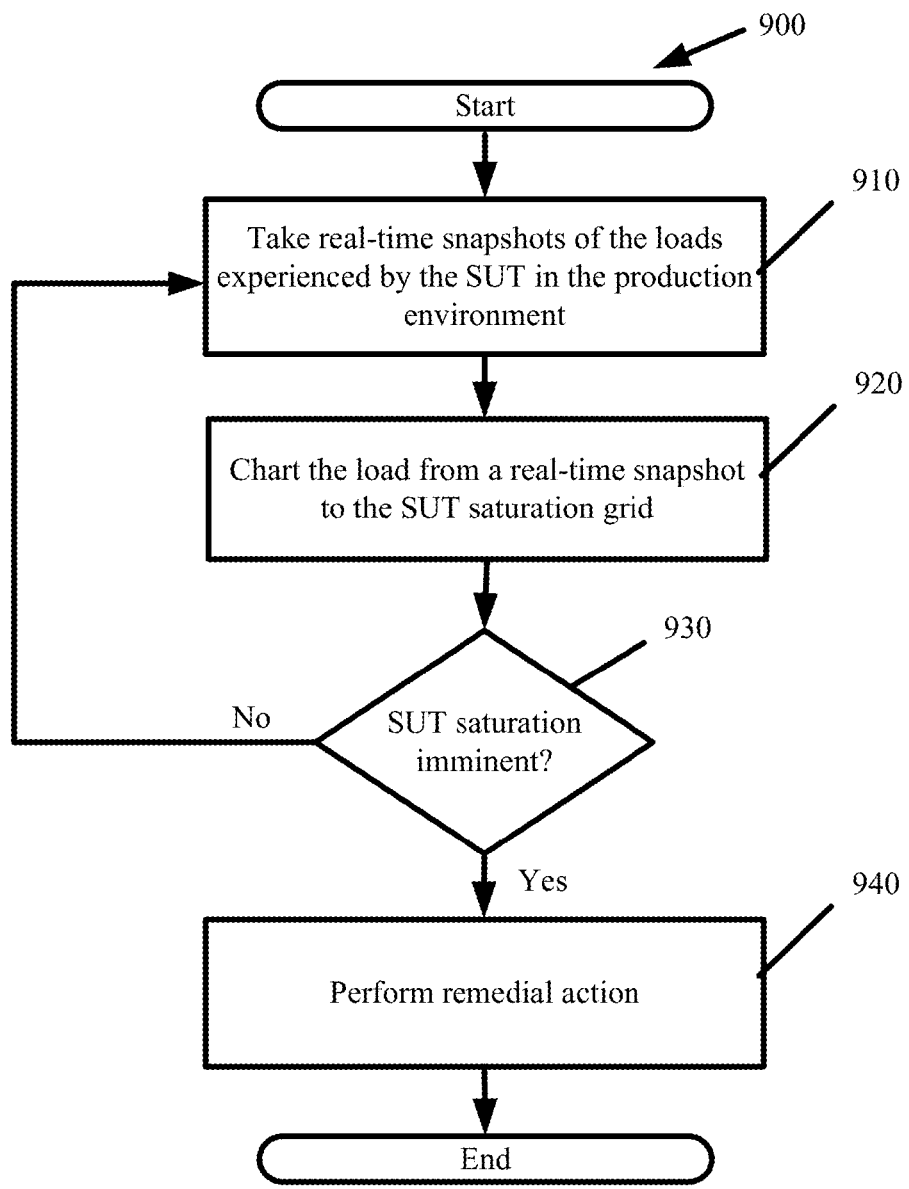
FIG. 9 presents a process for using the SUT saturation grid to ensure reliable performance of the SUT when deployed in a production environment in accordance with some embodiments.

FIG. 9 presents a process 900 for using the SUT saturation grid to ensure reliable performance of the SUT when deployed in a production environment in accordance with some embodiments. Process 900 can be performed once the test server has tested the SUT with the different test scenarios and has produced the SUT saturation grid identifying the various saturation points of the SUT. Process 900 is an extension of the dynamic testing described above and provides an application that uses the dynamic test results to preempt SUT saturation.

Process 900 commences by taking (at 910) real-time snapshots of the loads experienced by the SUT in the production environment. The real-time snapshots can be taken periodically (e.g., every ten seconds, every minute, etc.). The real-time snapshots capture how many clients are simultaneously uploading content streams to the SUT, downloading content streams from the SUT, and the streaming protocols involved with the uploads and downloads. The real-time snapshots also capture various information about each of the streams (e.g., bitrate, resolution, etc.).

The process charts (at 920) the load from a real-time snapshot to the SUT saturation grid in order to determine (at 930) if SUT saturation is imminent based on the current traffic patterns being serviced by the SUT in the production environment. The SUT saturation grid provides the process notice as to when failure or performance degradation as a result of saturation is likely to occur, thereby allowing preemptive action to be taken to mitigate against this possibility before it happens. In other words, using the SUT saturation grid, one can ensure reliable performance of the server by proactively taking steps to avoid the SUT from becoming saturated when in the production environment, whereas without the SUT saturation grid, one would have to guess as to when a failure or performance degradation would result from different and changing real-world traffic loads on the SUT, especially with respect to the unique software and hardware configuration of that particular SUT.

When charting the real-time snapshot to the SUT saturation grid does not indicate that performance degradation or failure is imminent, the process reverts back to step 910. At step 910, the process takes another snapshot of the real-time loads encountered by the SUT before charting that snapshot to the grid to determine if performance degradation or failure is imminent.

When charting the real-time snapshot to the SUT saturation grid indicates that performance degradation or a failure is imminent, the process performs (at 940) a remedial action. The remedial action preempts the potential for the SUT from becoming saturated. Based on the charting step, the process is able to identify either the specific SUT resource in danger of saturation or the specific saturation point that is imminent, and the process can customize the remedial action accordingly.

In some embodiments, the remedial action involves allocating additional resources to the specific resource in danger of saturation. For example, if the SUT saturation grid identifies the SUT memory nearing saturation for uploaded content streams, the process can dynamically allocate additional memory to the SUT for use in handling the uploaded content streams. Dynamic resource allocation is made possible when the SUT resources are partitioned across different virtual machines, to different processes running on the SUT, to different users, etc. In such cases, dynamic resource allocation involves taking a certain allocated but unused resource away from one partition to give to another partition in which the certain resource is in danger of overutilization. This can also involve halting one process or service so that the resources utilized by that process or service can be temporarily used to supplement resources of another running process or service. In other embodiments, the dynamic resource allocation involves bringing additional resources online. For example, if primary storage is running low, backup storage can be brought online to compliment the primary storage.

In some embodiments, the remedial action involves routing some load away from the SUT, thereby lessening the overall load on the SUT. Some such embodiments involve reconfiguring a director or load balancer tasked with distributing requests to the SUT and other servers in a given point-of-presence (PoP). The remedial action can target specific loads. For example, the remedial action can involve routing HLS requests from the SUT while continuing to feed the SUT HDS requests. Alternatively, the remedial action can involve routing upload/publishing content stream requests away from the SUT while continuing to feed the SUT download content stream requests.

It should be noted that process 900 can be performed automatically by the SUT when deployed to the production environment or by another machine (e.g., the test server) monitoring the health of the SUT and other servers in the production environment.

In some embodiments, the SUT saturation grid itself is used as an interactive interface for monitoring server health in a distributed platform. A content delivery network (CDN) is an example of a distributed platform. A CDN operates multiple PoPs in different geographic regions. Each PoP is comprised of one or more servers that operate to publish and deliver content to end users that are optimally served by the PoP. A CDN typically has a network operations control (NOC) team that is responsible for monitoring the health of the entire network. In most cases, the NOC is reactionary, responding to failures and performance degradations after they occur. Using the SUT saturation grids of different servers, the NOC can function proactively and preempt performance degradations and failures before they occur.

Figure 10:
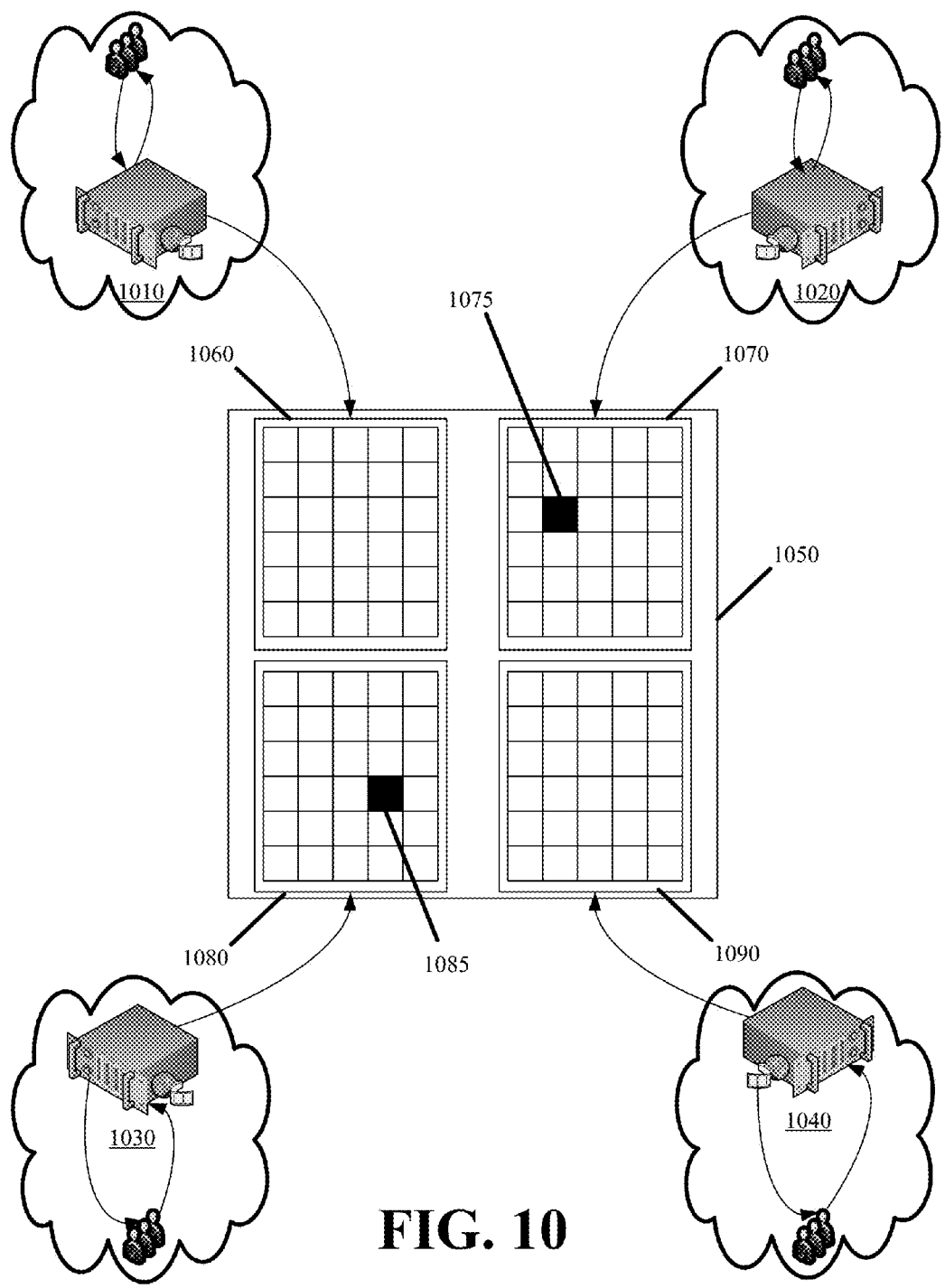
FIG. 10 illustrates using the SUT saturation grids for different servers for monitoring server health and preempting server performance degradation and failure in accordance with some embodiments.

FIG. 10 illustrates using the SUT saturation grids for different servers for monitoring server health and preempting server performance degradation and failure in accordance with some embodiments. The figure illustrates a set of streaming servers 1010, 1020, 1030, and 1040 under control of a common entity (i.e., CDN) and operating in a production environment. The figure also shows a central monitoring interface 1050 displaying the SUT saturation grids 1060, 1070, 1080, and 1090 that the test server of some embodiments generated for each of the servers 1010, 1020, 1030, and 1040.

Real-time load snapshots are periodically taken for each of the servers and passed to the machine providing the central monitoring interface 1050. The machine compares each server snapshot to the server's corresponding SUT saturation grid to determine if saturation is imminent. If so, the interface highlights or otherwise identifies certain blocks within the SUT saturation grids to detect the saturation that is imminent and the specific server in danger of saturation. In this figure, for example, block 1075 from the saturation grid 1070 of server 1020 and block 1085 from the saturation grid 1080 of server 1030 are highlighted to indicate that these servers 1020 and 1030 are in danger of saturation. The specific highlighted blocks 1075 and 1085 identify the specific saturated resource, performance issue, or failure that is imminent. From this single interface 1050, an administrator can monitor the health of all the deployed servers 1010, 1020, 1030, and 1040, and quickly identify any servers in danger of saturation.

Many of the above-described processes, engines, modules, and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 11:
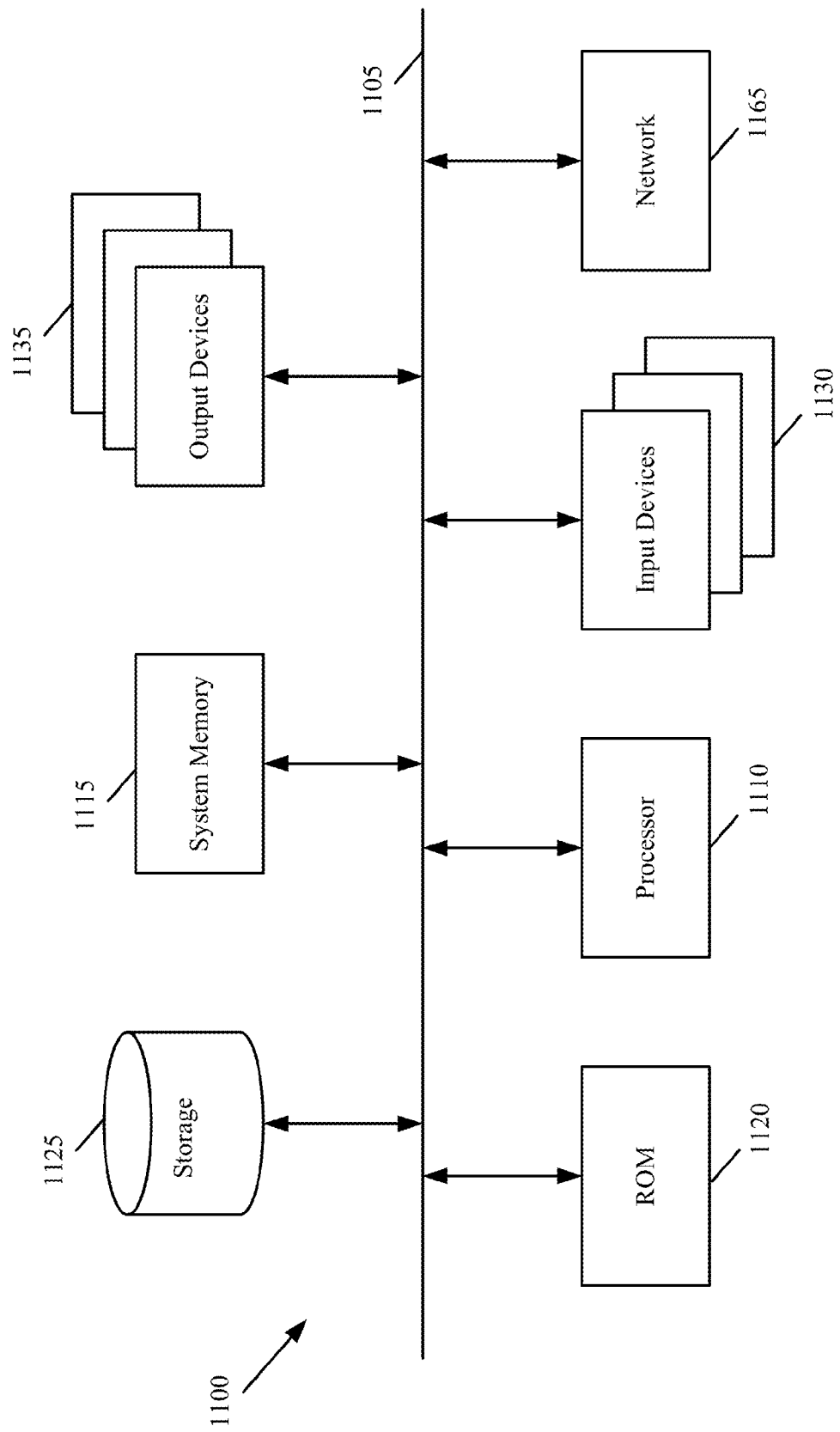
FIG. 11 illustrates a computer system or server with which some embodiments of the monitoring system are implemented.

FIG. 11 illustrates a computer system or server with which some embodiments of the monitoring system are implemented. Such a computer system includes various types of computer-readable mediums and interfaces for various other types of computer-readable mediums that implement the various methods and machines of the monitoring system described above. Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the embodiments described above. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments use a mass-storage device (such as a magnetic, solid-state disk, or optical disk and its corresponding disk drive) as the permanent storage device 1125.

Other embodiments use a removable storage device (such as a flash drive or solid-state disk) as the permanent storage device. Like the permanent storage device 1125, the system memory 1115 is a read-and-write memory device. However, unlike storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include alphanumeric keypads (including physical keyboards and touchscreen keyboards), pointing devices (also called "cursor control devices"). The input devices 1130 also include audio input devices (e.g., microphones, MIDI musical instruments, etc.). The output devices 1135 display images generated by the computer system. The output devices include printers and display devices, such as liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1100 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. A method comprising:
testing a streaming server under test (SUT) with a plurality of different test scenarios, each test scenario of the plurality of test scenarios specifying a different traffic mix with which to test SUT streaming capacity, wherein said testing comprises increasing each traffic mix from each test scenario of the plurality of test scenarios until the traffic mix achieves one of a plurality of SUT saturation points, wherein the traffic mix of each test scenario of the plurality of test scenarios comprises a different ratio of content streams and a different set of streaming protocols to simultaneously publish to the SUT and download from the SUT, and wherein increasing the traffic mix of each particular test scenario comprises increasing a number of content streams being simultaneously published to and downloaded from the SUT according to the ratio for the particular test scenario;
tracking for each SUT saturation point from the plurality of SUT saturation points, a particular traffic mix from each test scenario of the plurality of test scenarios achieving the SUT saturation point;
monitoring a real-time traffic mix placed on the SUT by a plurality of customers when the SUT operates in a production environment; and
performing a preemptive action as a result of a particular SUT saturation point of the plurality of SUT saturation points becoming imminent due to the real-time traffic mix mirroring any particular traffic mix from any test scenario of the plurality of test scenarios achieving said particular SUT saturation point.

2. The method of claim 1, wherein performing the preemptive action comprises redirecting a subset of the real-time traffic mix from the SUT to another streaming server operating in the production environment.

3. The method of claim 1, wherein performing the preemptive action comprises dynamically allocating additional resources to the SUT.

4. The method of claim 3 further comprising identifying at least one particular SUT resource from a plurality of resources that is affected by the particular SUT saturation point.

5. The method of claim 4, wherein dynamically allocating additional resources to the SUT comprises increasing the at least one particular SUT resource affected by the particular SUT saturation point.

6. The method of claim 1, wherein performing the preemptive action comprises performing a first action as a result of the real-traffic mix mirroring a particular traffic mix from a test scenario achieving a first SUT saturation point from the plurality of SUT saturation points and performing a different second action as a result of the real-traffic mix mirroring a particular traffic mix from a test scenario achieving a second SUT saturation point from the plurality of SUT saturation points.

7. The method of claim 1, wherein each SUT saturation point of the plurality of SUT saturation points is linked to a different one of processor, memory, and network resources of the SUT becoming saturated.

8. The method of claim 1, wherein each SUT saturation point of the plurality of SUT saturation points is linked to a different failure or decrease in SUT performance.

9. The method of claim 1, wherein the traffic mix of each test scenario of the plurality of test scenarios further comprises using a different set of content streams for said publishing and downloading, wherein the different set of content streams comprises different bitrates, codecs, and formats.

10. A method comprising
discovering streaming server capacity under a first test scenario of a plurality of test scenarios, wherein said discovering comprises generating a first load on the streaming server by (i) emulating client-side operation of a first set of clients simultaneously publishing to and downloading from the streaming server, a first set of content streams using a first set of streaming protocols, (ii) increasing the first load until achieving a failure or performance degradation associated with each saturation point of a set of streaming server saturation points, and (iii) recording a load at which the first test scenario achieves each saturation point of the set of streaming server saturation points;
discovering streaming server capacity under a second test scenario of the plurality of test scenarios, wherein said discovering comprises generating a second load on the streaming server by (i) emulating client-side operation of a different second set of clients simultaneously publishing to and downloading from the streaming server, a different second set of content streams using a different second set of streaming protocols, (ii) increasing the second load until achieving a failure or performance degradation associated with each saturation point of the set of streaming server saturation points, and (iii) recording a load at which the second test scenario achieves each saturation point of the set of streaming server saturation points; and
producing a grid with each particular saturation point of the set of streaming server saturation points and a corresponding load of the first test scenario and the second test scenario achieving the particular saturation point.

11. The method of claim 10 further comprising monitoring performance of the streaming server in a production environment by periodically taking snapshots of real-world traffic patterns imposed on the streaming server.

12. The method of claim 11 further comprising mapping said snapshots to the grid and identifying a real-world traffic pattern snapshot mirroring a load from any of the first test scenario and the second test scenario achieving a specific streaming server saturation point from the set of streaming server saturation points that is imminent.

13. The method of claim 12 further comprising outputting a warning identifying the specific streaming server saturation point that is imminent based on the real-world traffic pattern snapshot.

14. The method of claim 13, wherein said outputting comprises highlighting a region of the grid corresponding to the specific streaming server saturation point and the load from any of the first test scenario and the second test scenario achieving the streaming server saturation point.

15. The method of claim 12, performing a remedial action to prevent the specific streaming server saturation point from occurring, wherein said remedial action comprises one of dynamically increasing streaming server resources in imminent risk of saturation and dynamically routing real-world traffic away from the streaming server.

16. A dynamic load test system comprising:
a network interface communicably coupled to a streaming server under test (SUT);

a memory storing a plurality of test streams;

a processor dynamically load testing the SUT by generating a plurality of different test scenarios from the plurality of test streams and determining a load at which each test scenario of the plurality of test scenarios saturates the SUT, wherein determining the load at which each test scenario saturates the SUT comprises gradually increasing a load imposed on the SUT by each test scenario of the plurality of test scenarios until SUT performance degrades or fails and recording to said memory, the load at which each of the plurality of test scenarios causes SUT performance to degrade or fail, wherein the plurality of test scenarios comprises (i) a first test scenario generating a first load on the SUT by uploading to the SUT, a first set of the plurality of test streams using a first set of streaming protocols while simultaneously downloading from the SUT, a second set of the plurality of test streams using a second set of network protocols and (ii) a second test scenario generating a second load on the SUT by uploading to the SUT, a third set of the plurality of test streams using a third set of streaming protocols while simultaneously downloading from the SUT, a fourth set of the plurality of test streams using a fourth set of streaming protocols.

17. The dynamic load test system of claim 16, wherein the processor further monitors performance of the SUT under differing loads of the plurality of test scenarios.

18. The dynamic load test system of claim 16 further comprising a display presenting a plurality of different SUT saturation points and loads from each of the plurality of test scenarios producing each of the plurality of SUT saturation points.

* * * * *